Sept. 17, 1968  F. O. E. SCHULTZ  3,401,948
VEHICLE LEVELING SYSTEM AND CONTROL VALVE
Filed Jan. 21, 1966  2 Sheets-Sheet 1
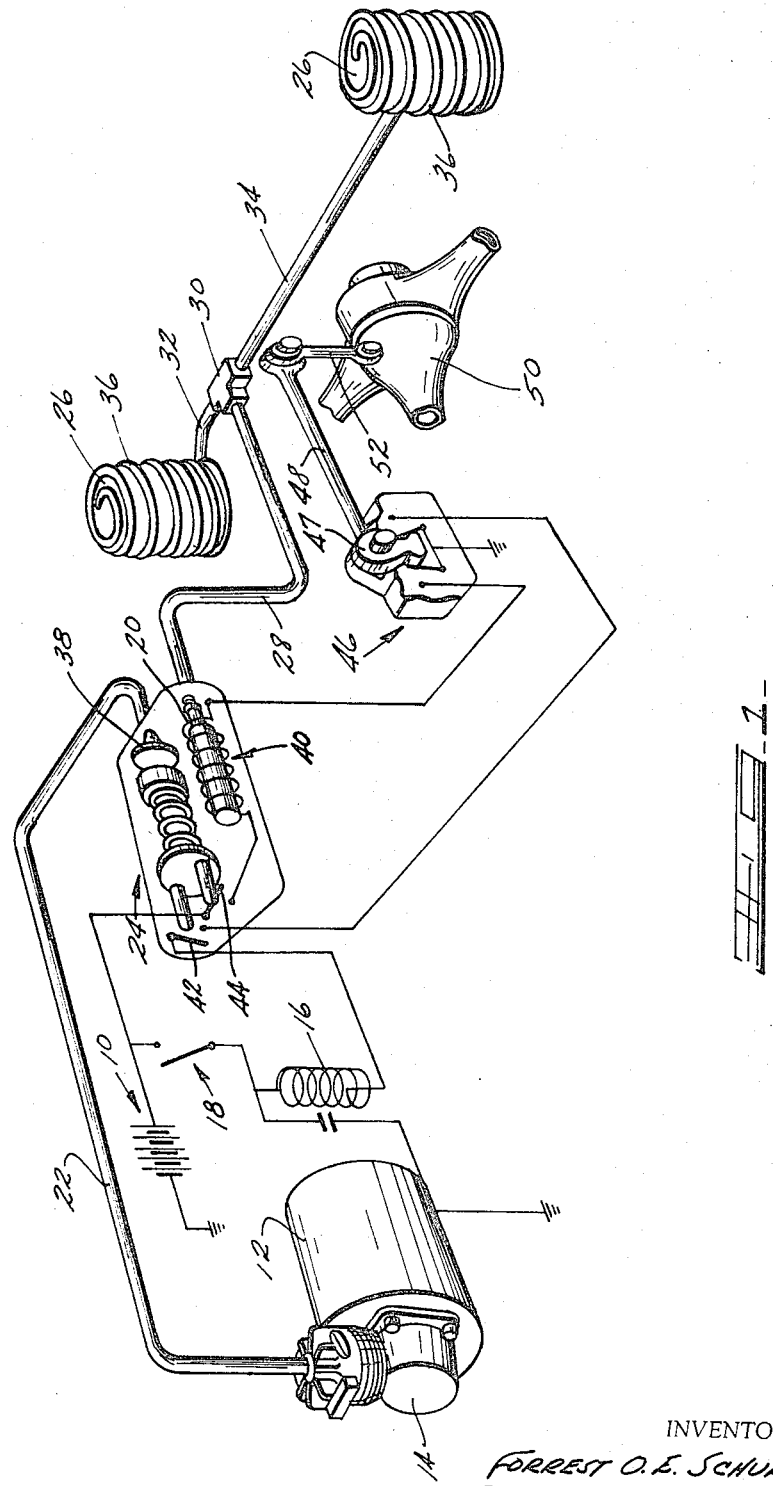
INVENTOR.
FORREST O. E. SCHULTZ
BY
IRVIN L. GROH
ATTORNEY Sept. 17, 1968  F. O. E. SCHULTZ  3,401,948
VEHICLE LEVELING SYSTEM AND CONTROL VALVE
Filed Jan. 21, 1966  2 Sheets-Sheet 2
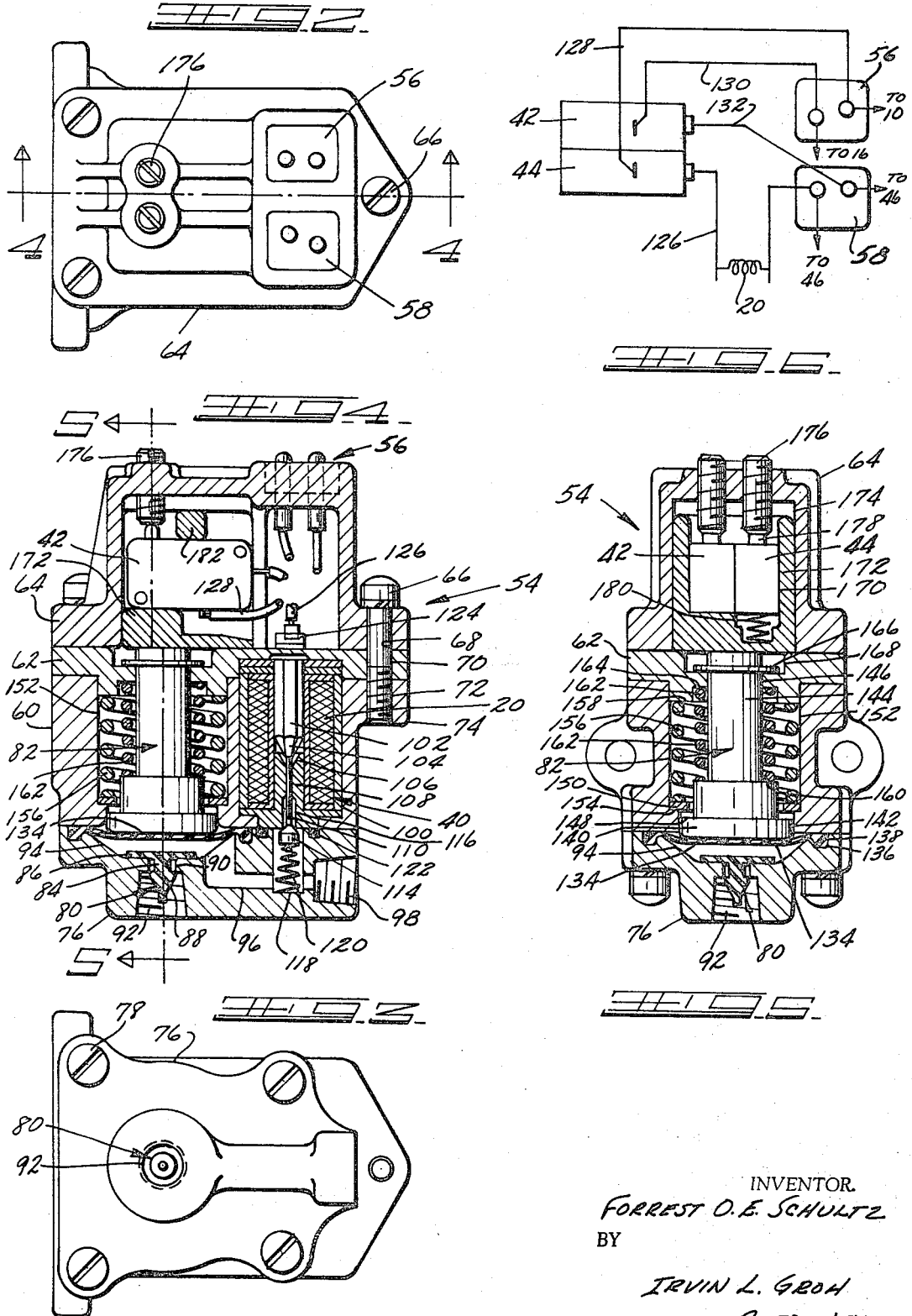
INVENTOR.
FORREST O. E. SCHULTZ
BY
IRVIN L. GROH
ATTORNEY United States Patent Office 3,401,948
Patented Sept. 17, 1968

3,401,948
VEHICLE LEVELING SYSTEM AND
CONTROL VALVE
Forrest O. E. Schultz, Owosso, Mich., assignor to Midland-Ross Corporation, Cleveland, Ohio, a corporation of Ohio
Filed Jan. 21, 1966, Ser. No. 522,111
7 Claims. (Cl. 280—6.1)

ABSTRACT OF THE DISCLOSURE

A levelizing system for automotive vehicles utilizing a mechanical spring system coacting with a variable rate pneumatic spring system in which the rate of the pneumatic spring is varied by directly supplying pressure only when pressure is needed to support the load and in which pressure is reduced when the pressure is in excess of that required to support a given load.

---

This invention relates to automotive vehicles and more particularly to load leveling systems for automotive vehicles.

Still more particularly, this invention relates to an improved load leveling system wherein activation energy is direct from source to supports, eliminating intermediate storage components.

Still further, the invention relates to a novel control means for a load leveling system wherein condensate from moisture-laden air at low temperatures does not impair function of the system.

Still further, the invention relates to a system for improving vehicle comfort, handling, and longevity.

Still further, the invention relates to improved means of protecting a vehicle suspension system against inadvertent and inaccurate correction.

The problem

When an automobile is manufactured, the springs are designed for a certain loading, usually approximately equal to the weight of some number of passengers and sometimes including a luggage load. Naturally, when the vehicle is empty the springs extend and the body of the vehicle is held in an abnormally high position. Conversely, when the vehicle is loaded greater than its design load, the springs are compressed and the body is held at a lower height than intended by the designers. Hence, the body of the vehicle is seldom at the height the designers intended, and the full aesthetic appeal of the vehicle is not realized.

Since headlights are rigidly attached to a vehicle it is easily seen that a light load can result in a rear high attitude and loss of illumination distance from the headlight. Conversely, a heavy load may cause raising of the headlight beams and danger to on-coming traffic.

Steering geometry is designed about an arbitrarily chosen vehicle attitude. Any variance from this attitude due to a load change will result in less than optimum steering performance.

Similarly, drive line geometry is based upon a single position which results in ideal operation of this mechanism at one load only.

It is a recognized fact that riding comfort is directly related to natural frequency. Natural frequency is in turn related to the spring rate with respect to the load imposed thereon. It follows that since load varies with virtually every trip a vehicle makes, the spring rate should also vary for highest comfort. Mechanical springs have a constant rate, but air springs have variable rates dependent on the pressure within. The total spring rate of the two combined is additive, hence it is variable.

Greater riding comfort of the passengers suggests less shock and vibration in the vehicle itself. There is evidence of this in prolonged vehicle life, especially in those components sensitive to shock or vibration.

Previous attempts at solving this problem have not been very successful. Helper springs are useful only with a heavier than average load and actually hinder when the load is removed. Special shock absorbers can be pumped up for heavy loads and evacuated for light loads but this involves numerous inconvenient trips to a gas station. Both of these are part-time, half-way solutions at best.

Previous load leveling systems utilizing air have been either complicated or of an add-on nature applicable only to luxury vehicles. Some of them utilize manifold vacuum and are especially susceptible to failure caused by high altitude and low temperature. Others operate on an air compressor that pumps air into a reservoir from which it is metered to the lifting units at the wheels. These are wasteful of energy because of the high pressure that must be maintained in the reservoir, and are subject to low temperature problems because of the amount of air involved.

The invention described herein is an uncomplicated, inexpensive system with none of the drawbacks found in previous inventions. It is a full-time system, unaffected by low temperatures and/or high altitudes, using a direct-feed system between compressor and air springs that is sufficiently economical for application to mass-marketed vehicles.

It is therefore an important object of this invention to provide an economical load leveling system suitable for application to mass-marketed vehicles.

Another object of the present invention is to provide an accurate, convenient, full-time, variable rate load leveling system for vehicles.

Still another object of the present invention is to provide a load leveling system with small susceptibility to problems caused by low temperatures and/or high altitudes.

A further object of this invention is to provide a load leveling system with a unique control valve which permits the activation of a compressor only when pressure is needed by the air springs, with no intervening air reservoir.

These and other objects of this invention which will appear in the following description and appended claims are accomplished by the arrangement and combination of elements set forth in the following detailed description according to the present invention.

FIGURE 1 is a schematic view of the load leveler system of the present invention;

FIGURE 2 is a top plan view of the control and exhaust valve as used in the system of FIGURE 1;

FIGURE 3 is a bottom plan view of the control and exhaust valve;

FIGURE 4 is a vertical sectional view of the control and exhaust valve taken along the line 4—4 of FIGURE 2;

FIGURE 5 is a sectional view taken along the line 5—5 of FIGURE 4; and

FIGURE 6 is a wiring diagram of the control and exhaust valve.

Before explaining the invention in detail it is to be understood that the invention is not limited in its application to the particular construction and arrangement of parts illustrated in the accompanying drawings, since the invention is capable of other embodiments and of being practiced and carried out in various ways. Also it is to be understood that the phraseology or terminology employed herein is for the purpose of description and not of limitation.

Introductory description of the invention

The automatic load leveling system of the present invention is adapted for use with derated springs of an automotive vehicle. By the present invention, separate supporters are used with derated springs and these automatically maintain uniform height and compensate for load changes.

The present system comprises an air pump driven by an electric motor, a control and exhaust valve, and a sensing switch. Appropriate tubing connects these units and the supporters. Electrical wiring connects the system to the electrical system of the vehicle to provide a complete installation.

An important feature, as will become apparent, is that no reservoir is used in the present system and this provides a substantial distinction over the prior art systems which utilize such. The prior art systems accordingly require the compressor to work more heavily, at a rate to maintain an operating pressure in the reservoir somewhat above the highest anticipated support pressure. By distinction, the present invention provides a much more economical system by the fact that the pump is used on call, only to the pressure as needed, to directly supply the system. Less wear is imposed on the pump and motor and thus greater durability is provided. This arrangement is made possible by a unique control and exhaust valve working in combination with a sensing switch. Attached to the differential or equivalent, the sensing switch reports the body height relative to the chassis, using the attachment as a point of reference. This information is passed along to the control and exhaust valve. The combination either actuates the compressor for lift purposes or exhausts air from the supporter units to thereby lower the body when load is removed.

The control valve, among other features, incorporates an electric solenoid exhaust. The heat of this solenoid is used to melt any ice crystals in cold weather formed by freezing of condensate from the compressed air. All of the novel features will be brought out in detail hereinafter.

*Specific description of the invention; the overall system*

All elements that make up the system of the present invention are shown in FIGURE 1. Power for pumping the air needed, as well as the power used to exhaust the system, is supplied from the vehicle storage battery 10. The motor 12 for the pump 14 is operated through a relay 16 which in turn is service connected with the ignition switch 18. By this arrangement, pumping cannot occur when the vehicle is left with the ignition locked. The exhaust solenoid 20 on the other hand is wired directly to the battery 10 so that this function can and will take place on an unattended vehicle. A low amperage blow-type fuse is used in the battery connection as a protective measure.

The air delivered from the pump 14 is plumbed via pipe 22 to the control and exhaust valve 24 and thence directly into each of two support elements 26. A pipe 28 leads from the control and exhaust valve 24 to a T-connector 30. From the T-connector 30, pipes 32 and 34 lead to the air support elements 26. The elements 26 are elastomeric air bags inserted within the rear coil springs 36 of a coil spring supported chassis. Also, within the scope of the invention, support elements associated with the shock absorbers have been operated successfully and can be readily substituted mentally into FIGURE 1 since nothing else would change.

The control and exhaust valve 24 performs many tasks by means of subelements contained within a common housing. The tasks performed are as follows:

(1) The check valve 38 isolates the pump 14 from the air support elements 26, locking the air in the latter.

(2) The exhaust valve 40 is of the electric solenoid type. When the solenoid 20, schematically shown in FIGURE 1 is deenergized, the valve 40 remains closed. Thus the air is locked into the supports 26. When the solenoid 20 is energized it causes the exhaust valve 40 to open and this allows air to be expelled from the support elements 26.

The air pressure within the body of the control and exhaust valve 24 is in direct communication with the air in the support elements 26, and impinges upon a movable member 82, FIGURES 4 and 5, against the bias of a pair of cooperative dual springs 156 and 162 later described. This is effective to cause the opening and closing of a pair of independent switches 42 and 44 in conformity with system air pressures. These switches include a high pressure limit switch 42 and a low pressure limit switch 44. These are used to protect the apparatus beyond the limits of its operation. The low pressure limit switch 44 is associated with the exhaust valve 40. This switch 44 is adjusted to open whenever pressures within the system fall below a predetermined level, usually on the order of 5 p.s.i.g. This opens the circuit to the exhaust solenoid 20. The object of this function is to prevent a continuous load on the battery 10 of the vehicle in the event of parking for long periods of time with return to trim prevented by an obstruction, such as one wheel on a curb. Were it not for this switch the solenoid 20 would perform this continuous duty causing battery 10 to suffer. The low pressure limit switch 44 is normally open by autogenous spring pressure, but closed when the system is operational, as will become evident later.

The high pressure limit switch 42 is connected in series with the motor 12 which drives pump 14. The high pressure limit switch 42 is adjusted to open whenever pressures in the system rise above a predetermined value. This prevents overloading the motor 12 beyond the upper limit of the system. In the case of support elements 26 installed within coil springs 36 as indicated, the high pressure limit switch 42 may be set to operate for as low as 25 p.s.i.g. For shock absorber-type elements, the high pressure limit switch 42 may be adjusted to 125 p.s.i.g. or more. The purpose is the same in all cases, to protect the system components against excessive pressure if an obstruction prevents normal movement, or in the event of overloading of the vehicle. This switch is normally closed by autogenous spring loading, and remains so when the system is normally operational. When an excessive pressure is encountered in the system the spring load is overridden and the switch is operated to stop system operation, as will become evident later.

The height sensing switch 46 acts as a signal means and makes the air leveling system atuomatic. It is at one and the same time a signal to call for air pressure into the support elements 26 and a gauge to check the net results. It has both static and dynamic characteristics.

This device includes an operating pin 47 that is coupled to the operating arm 48, in turn connected to the differential 50 or other suitable component of the chassis which can serve as a reference, by a connection link 52. A hydraulic damping mechanism and torque limiting over-travel arm to shaft coupling introduce a time delay into sensing switch 46 to avoid false signals due to normal travel jounce and rebound. Thus quick vibrations of the vehicle do not result in actuation of the system. Sustained loads however cause the hydraulic damping fluid to be moved after the appropriate time delay to close one or the other of the two switches contained in this unit to activate the system.

The height sensing switch 46 is mounted beneath the vehicle, rigidly attached to the body-frame unit and through the linkage illustrated, to the differential case or the like. Thus an increase or decrease in body to axle clearance causes a change in position of the operating pin 47, within the sensing switch 46, thus actuating either the pump 14 or the exhaust valve 40.

*Operation*

If the body of the vehicle is lowered by adding load, the control valve 24 causes the pump 14 to be turned on to pump air to the support elements 26. The pump 14 automatically shuts off when appropriate trim height is reached. If the body is too high because of reduced load, the control and exhause valve 24 causes air to be exhausted from the support elements 26 and the exhaust automatically stops when trim height is achieved. Trim height is that arbitrarily chosen position which in the eyes of the stylist is the ultimate in appearance. A car can be put into this position artificially, by choice of the precise load needed or by providing a leveling system to search out and retain as is the case with this invention.

Distinguishing features are apparent from the foregoing description, as follows:

(1) Because the electrically powered pump 14 is only energized when the ignition switch 18 is turned on, the body can only be pumped up when the ignition key is in and turned on.

(2) Air can be relieved from the system at any time because the exhaust system is permanently hooked up to the battery, but the low pressure limit switch automatically prevens drain on the battery as caused by an obstruction.

(3) Maximum correction for the system can be made in two or three minutes. This illustrates the economy of the present invention by the fact that for a production automobile a 1/15 horsepower 12-volt motor is required, drawing less than 10 amps. This unit is so small that it can be put in the engine compartment on the firewall, on a wheel housing, or in the trunk.

Load: Numerous references to load have been made throughout this description. While it is somewhat easier to associate suspension with load, particularly when up or down movement of the vehicle body is concerned, it is a fact that this air leveling system does not respond to load as such except as it affects height. It is a position sensitive mechanism and it is therefore more directly and accurately demonstrated in terms of measurement of height. In developing this invention, it has been the practice to use the rear bumper to ground distance as a measurement basis and at this point a differential in height should not exceed ½ inch when loads involved are within the operating range of the suspension system.

Vehicular considerations: There are two mistaken notions that have in the past been identified with air leveling systems, that have detracted from one of the most promising improvements to vehicle stability, comfort and charm of recent years. The first of these places the concept in the category of helper or overload springs. This implies that the function is limited to the unusual conditions of loading. Air levelers are full time guardians of ideal steering geometry, headlight aim, drive line action, riding comfort and good appearance.

Secondly, air leveling is often compared to air ride of a few years ago. In some respects this should be advantageous, for in spite of its many shortcomings, air ride was the most comfortable ride the motoring public has experienced. The air leveling system in its present form captures virtually all of this comfort while avoiding many flaws that were inherent in air ride.

There is one significant factor which more than anything else emphasizes the nature of air leveling as a means of ride improvement. Ideally the rate of any suspension system should be in direct proportion to the sprung mass. Different loadings will vary the sprung mass. Therefore, a variable rate suspension system is the only feasible solution to ideal ride through the total range of loadings from minimum to fully laden. Air leveling is a practical solution in an uncomplicated package and at a reasonable cost.

*Specific components*

The control and exhaust valve:

This is shown in FIGURES 2–6 inclusive. This unit is completely enclosed within a composite housing 54. Two wire harnesses terminate at the terminals 56 and 58 in the body of this unit for operable connection to the vehicle.

The composite housing 54 includes a central body portion 60. A spring and solenoid retainer 63 fits directly on the central body portion 60, and above the spring and solenoid retainer is a top cover in the form of a switch assembly housing 64. The units 62 and 64 are secured in place by bolts 66, passed through holes 68 and 70 respectively and into threaded holes 72 of bosses 74 of the central body portion 60.

A head 76 fits over the other end of the central body portion 60 and is held in place by screws 78 turned into appropriate threaded holes of the central body portion.

As shown in FIGURES 4 and 5, the composite housing 54 contains a check valve 80, the exhaust solenoid valve 40, the high pressure limit switch 42, the low pressure limit switch 44, and a piston 82 which functions as a means of translating system pressures to both of these switches.

The check valve: The check valve 80 includes a rod-like body 84 with a transverse contact flange or disc 86 at the top end. The bottom end is formed as a cone 88 that is pressed down through an opening 90 in the head 76. A female threaded inlet opening 92 is provided to receive a fitting for connection of pipe 22 as shown in FIGURE 1. This provides air from the pump 14. The inlet opening 92 and the opening 90 are interconnected for flow of air through the control and exhaust valve 24.

The opening 90 which receives the body portion 84 of the check valve 80 connects into an enlarged cavity 94 above which the piston 82 operates to translate system pressures to both of the limit switches 42 and 44. Specific description of the piston arrangement 82 is provided later. The cavity 94 connects with a flow passage 96, which terminates in a threaded outlet opening 98 to receive a threaded fitting for connecting the tubing 28, FIGURE 1, for supplying air to the support elements 26 as indicated.

In a preferred embodiment of the invention, the check valve 80 has been made of synthetic rubber, free of any insert, operating without the aid of a spring other than its own resilience. It is desirable to have as nearly a perfect seal as possible both for the reason of sustaining the supports 26 under pressure for relatively long periods of time, and to reduce any tendency for pressure to build up in the line to the pump 14, causing the latter to have to start under a pressure head on subsequent demand. The elastomer of which the check valve 80 is made must be able to stand the temperature range prescribed for automotive products of this nature. This means a low of —40° F. At all temperatures below freezing it is not uncommon to experience frozen condensate from the compressed air at this point. When broken free by supply pressure, this valve performs extremely well.

This brings up a most interesting and important aspect of the air leveling system as a whole. This is its ability to function even in the presence of moisture at temperatures far below freezing. The absence of a reservoir eliminates the natural location for ice to form and reduces the quantity of air needed along with its natural moisture.

The direct tube 22 from the pump 14 to the control and exhaust valve 24 is of such a relatively small volume that a rapid pressure rise occurs whenever the pump starts, as a result of a demand for air. A resultant localized temperature rise is produced, which, coupled with the pliability of the check valve 80, affords unimpaired operation virtually oblivious to a low ambient temperature.

The solenoid exhaust valve: This is designated by the reference numeral 40 in FIGURES 1 and 4. It will be noted that the annular solenoid coil 20 is in axial alignment with the central body portion 84 of the check valve 80. This is not necessarily limiting on the invention but provides a convenient structural orientation. The annular solenoid coil 20 fits into a cylindrical recess 100 of the central body portion 60. The armature 102 has a frustoconical end 104 which engages a mating frustoconical recess 106 in a guide member 108. This provides positive aligning engagement with the valve stem 110. The valve stem 110 is a rod-like element and extends through an axial opening in the guide member 108, which is a continuation of the frustoconical recess 106. At the bottom end the valve stem 110 is provided with a valve element 114 having a frustoconical working face. This valve element 114 seals against the circular mouth of a vent opening 116 through which air can be exhausted from the system when the armature 102 is actuated to engage the valve stem 110. The valve element 114 operates in an exhaust passage 118 which intersects the air passage 96. A spring 120 is seated between the bottom of the opening 118 and the bottom side of the valve element 114. This spring 120 is effective to bias the valve element 114 to a closed position.

An O-ring 122 is set into an annular recess in the head 76, thereby providing a positive seal between the valve guide member 108 and the head.

One end of the solenoid coil 20 is electrically connected to one side of the terminal 56 as shown in FIGURE 6. At the top, FIGURE 4, is a connection 124 to which a wire 126 is fastened that leads to the low pressure switch 44. As shown in the wiring diagram of FIGURE 6, the other wire 128 of the low pressure limit switch 44 is connected to the terminal 56. From terminal 56 a wire 130 leads to the high pressure limit switch 42. A wire 132 leads from the high pressure limit switch 42 back to the terminal 58 to complete the circuit.

Operable connection to the vehicle is as follows:

As indicated in FIGURE 6, the two connections of the terminal 58 are attached to the height sensing switch 46. One connection of terminal 56 is attached to the battery 10, and the other to the relay 16, of FIGURE 1.

Advantages of the solenoid exhaust valve: First, this valve performs at low temperatures by doubling as a heater to thaw out the exhaust valve element should it ever become frozen in place by frozen condensate from the compressed air of the system. Secondly, it provides a relatively slow rate of exhaust; and the relatively delicate dimensions that evolved in present invention are less likely to suffer abuse as frequently encountered with purely mechanical activation.

The maximum pressure used in the system of the present invention will probably not exceed 140 lbs. per square inch gauge. Applying this against the small effective area of the valve element 114 and compensating for forces involved in valve opening, a small force factor is required of the solenoid. This will include a factor of safety to offset the possibility of a low battery.

Although the solenoid exhaust valve 40, as well as the entire control and exhaust valve 24, for that matter, will operate in any position, there is at least one advantage for mounting it vertically with the valve element upwardly and the coil beneath. This is FIGURES 4 and 5 inverted. The valve spring 120 is relatively light and will not then have the additional task of holding the weight of the solenoid armature 102. Clearance is provided between the valve stem 110 and the armature 102 when the solenoid coil 20 is deenergized. This clearance takes into account the normal wear and the natural tendencies for the rubber valve element 114 to embed into the valve seat. Vertical mounting will therefore result in an impact between the armature 102 and the valve stem 110 whenever the solenoid coil 20 is energized. No injury to parts is encountered, but this impact is not design compensated as part of the force of the coil 20. In case of a freeze-up, only the power of the coil 20 is available to open the valve 114 after the heat has thawed out the condition. The impact will already have been spent some moments before.

*The limit switches—and means for translating system pressures to the limit switches*

The high pressure limit switch 42, the low pressure limit switch 44 and the piston 82, or means for translating system pressures to the switches are so closely related both physically and in their function that they are treated as a unit.

A single piston or sensing means 82 is used. This provides a compact structure and substantially eliminates the possibility of leakage.

The low pressure switch 44 will function in the range of about 3–7 p.s.i.g. while the high pressure switch 42 will be used at pressures considerably higher. In the case of air bags such as used inside conventional coil springs, an adjustment range within the limits of 15 to 30 p.s.i.g. should be used. For units associated with shock absorbers, a higher adjustment range of 90 to 140 p.s.i.g. will be necessary. A single spring capable of interrupting pressures of 3 to 140 p.s.i.g. with any appreciable movement at both extremes would necessarily be bulky and require extensive adjustment at assembly. In accordance with the present invention a novel dual spring arrangement has been used in combination with the piston of sensing means 82.

As shown in FIGURES 4 and 5, an elastomeric diaphragm 134 has a ring edge 136 which is held captive in a groove 138 in the head 76. This substantially eliminates all possibility of leakage. The diaphragm 134 engages the piston 82. As best shown in FIGURE 5, the piston 82 comprises a head 140 operating in a cylindrical opening 142 in the central body portion 60. The body portion 144 of the piston 82 operates in an opening 146 in the spring and solenoid retainer 62. A first shoulder 148 beneath the head 140 engages a retainer washer 150. The retainer washer 150 operates in a cylindrical cavity 152 and normally abuts a shoulder 154 at the bottom end of that cavity. A high pressure spring 156 is confined between the retainer washer 150 and an annular shoulder 158 of the spring and solenoid retainer 62. A second shoulder 160 of piston 82 confines one end of a low pressure spring 162, and the other end of the spring engages an annular recess 164 of the spring and solenoid retainer 62.

A snap ring 166 is fastened in a groove in body 144 of the piston 82 and engages the bottom of a recess 168 to avoid unnecessary overtravel of piston.

The limit switches 42 and 44 are positioned within a cavity 170 of a movable carrier 172. Carrier 172 reciprocates in a cavity 174 of the switch housing 64. Adjustment screws 176 are provided in the switch housing 64 to engage the buttons 178 of the switches 42 and 44. A spring 180 is positioned under the low pressure switch 44. This provides protection for the switch as set forth below.

A switch retainer 182 fits across the top of the cavity 170 to hold the switches 42 and 44 in position, FIGURE 4.

It should be noted at this point that a low pressure parameter of 3 to 7 p.s.i.g. is suitable for all cases. Thus the low pressure spring 162 will be of the same value for all units. However the high pressure spring 156 will be selected. Thus a typical control for a system using air bags would be adjusted for 3 to 7 p.s.i.g. low pressure and 30 to 35 p.s.i.g. for the high pressure.

A typical system using the shock absorber-type support element would have a low pressure level of 3 to 7 p.s.i.g. and a high pressure of 100 to 140 p.s.i.g. The present invention makes possible the opening and closing of the switches 42 and 44 within the adjustment ranges in any given unit. The switches 42 and 44 are of the snap action type and have an operating range of a few thousandths of an inch.

Travel of the piston 82: The low pressure range of 3 to 7 p.s.i.g. is very close to zero. Thus very low air pressure in the system is effective to move the piston 82 and thereby close the low pressure limit switch 44. To prevent premature movement of the high pressure spring 156, it is preloaded to a point 5 to 10 p.s.i.g. air pressure equivalent below the low point of the high pressure range in question whereby piston travel is reduced to a minimum thus reducing wear and saving space.

The low pressure spring 162 is designed to permit travel of the piston 82 to close the low pressure switch 44 before the shoulder 148 of the piston contacts the retainer washer 150. A margin of safety of a few thousandths of an inch is provided in view of the fact that once contact is made, no further movement will occur until preload of the high pressure spring is offset.

The purpose of the adjustment screws 176 is to bring the switches 42 and 44 within operating range, and thereby provide fine tuning of the system.

The spring 180, mounted beneath the low pressure switch 44 is a safety factor. Thus in the event travel ever exceeds the normal overtravel within the switch 42 itself, the function of the high pressure switch 42 will not be impaired and the low pressure switch will not be damaged. A preload in the spring 180 of two to three times the operating force of the low pressure switch 44 will suffice.

Summary

Compared to similar equipment now available to the motoring public, the present invention provides a load leveling system that displays usefulness in its full-time operation, in its all-climate range, and in its convenience.

Air leveling is a significant improvement in suspension. Automatic control is a most desirable contribution to air leveling. Electrical operation is provided by the unique control and exhaust valve 24. The direct connection of the pump 14 through valve 24 to the air bags 26, without the use of a troublesome and expensive reservoir, is a distinct refinement to automatic operation.

Advantages of the present invention include the maintenance of the vehicle at its design height at all times, automatically and without attention by the driver.

The ride can be immeasurably improved because the suspension can be designed for zero load. Ride harshness can be avoided when the vehicle is occupied by a single 90 lb. woman, as well as when it is overloaded with six men. Most bottoming and excess spring rebounding also can be eliminated.

Appearance is considerably improved because the car is always kept on an even keel. This will simplify the stylist's problems these days when the emphasis is on sleek, horizontal lines. There will be no problem of wrong appearance when the back of the car is extra high or extra low.

The headlights will remain properly aimed at the area in front of the car and not into the eyes of an oncoming motorist when the car is loaded. This amounts to a substantial safety factor.

Steering will also benefit, as will durability of the vehicle by the fact that its universal joints will wear less when the engine, driveshaft and differential are all in their correct design attitude.

Other advantages include the fact that lighter springs can be used which will not take a set; and the car will be at its best trim on the showroom floor without added weights or tying down springs in accordance with prevailing prior art practices.

The control and exhaust valve 24 can be "buried" back near the tail light so that it will not need splash protection. This unit has two safety switches. One provides protection for the levelizer system against excessive loading of the vehicle; and the other protects the battery in case of obstruction to the vehicle's downward movement when unattended. The solenoid coil 20 utilizes less than 1 ampere of current.

The sensing switch 46 of FIGURE 1 has a dampening system that prevents operation of the levelizer until the load has been changed for a few seconds. This prevents road bumps from activating the system.

The system has advantages over a vacuum driven system because it is unaffected by higher altitudes and operates better at lower temperatures. Further the system is more durable than compressor-reservoir units because the pump only functions when a change in car height is called for and is more economical to produce because of the omission of the reservoir.

What is claimed is:

1. In a levelizing system for an automotive vehicle having a sprung mass, an unsprung mass, and spring means on the unsprung mass supporting the sprung mass,
variable lift means coacting with said spring means to assist said spring means when said vehicle is loaded within certain limits,
fluid pump means connected to said variable lift means to increase the lift capacity thereof, power means for actuating said pump means,
control and exhaust means,
fluid conduit means connecting said pump means to said control and exhaust means and said control and exhaust means to said variable lift means,
said control and exhaust means comprising means for actuating said power means to increase the lift capacity of said variable lift means, and exhaust means to reduce the lift capacity of said variable lift means,
and signal means mechanically connected between said sprung and unsprung masses and electrically connected to said control and exhaust means,
whereby said power means is actuated when the distance between said sprung and unsprung masses is less than a selected amount due to load addition and said exhaust means is actuated when the distance between said sprung and unsprung masses is greater than a selected amount due to load removal.

2. The invention of claim 1 wherein the automotive vehicle includes electrical power means,
the spring means comprises mechanical spring means,
the variable lift means comprises variable lift pneumatic means,
the power means comprises electric motor means connected with the electrical power means of the vehicle and with the pump means to produce compressed gas for inflating said variable lift pneumatic means,
said control and exhaust means comprises first control means for actuating said electric motor means when the distance between said sprung and unsprung masses is less than a specified value due to load addition to the vehicle, to thereby increase the lifting power of said variable lift pneumatic means, and second control means for actuating said exhaust means to release compressed gas from said variable lift pneumatic means when the distance between the sprung and unsprung masses of the vehicle is greater than a specified value due to load removal from the vehicle,
and wherein the signal means is secured to the sprung mass and includes operating arm means connected between said separate control means and the unsprung mass.

3. The invention of claim 2 wherein said variable lift pneumatic means comprises variable inflatable bag means,
said first control means comprises pressure operated electric switch means,
said second control means comprises electric switch operated exhaust valve means,
and said signal means comprises separate switch means connected to said first and second control means.

4. The invention of claim 1 wherein the automotive vehicle includes electrical power means,
the spring means comprises mechanical spring means,
the variable lift means comprises variable lift pneumatic means,
the power means comprises electric motor means connected with the vehicle electrical power means and with the pump means to produce compressed gas for inflating said variable lift pneumatic means,
the control and exhaust means comprises:
a housing,
first control means in said housing for actuating said electric pump means when the distance between said sprung and unsprung masses is less than a specified value due to load addition to the vehicle, to increase the lifting power of said variable lift pneumatic means, inlet and outlet means in said housing, passage means in said housing extending between said inlet and outlet means, exhaust valve means in said passage, and including exhaust passage means, second control means for said exhaust valve means, and means for translating pressures within said passage means to said control means for actuating said exhaust valve means, said conduit means connecting said pump means to said inlet means of said control and exhaust valve mechanism and conduit means connecting said outlet means of said control and exhaust valve mechanism to said variable lift means, and said signal means connected between said sprung and unsprung masses being connected to said second control means, and to said power means through said first control means, whereby said exhaust valve means is opened when the distance between said sprung and unsprung masses is greater than a selected amount, and said power means for said pump means is actuated when the distance between said sprung and unsprung masses is less than a selected amount.

5. The invention of claim 1 wherein the automotive vehicle includes electrical power means, the spring means comprises mechanical spring means, the variable lift means comprises variable lift pneumatic means, the power means comprises electrical motor means connected with the vehicle electrical power means and with said pump means to produce compressed gas for inflating said variable lift pneumatic means, and the control and exhaust valve means comprises:

a housing, inlet and outlet openings in said housing, a conduit passage in said housing extending between said openings, an elastomeric check valve in said passage adjacent to said inlet opening, including a body having a retainer at one end and a flap seal element at the other end to engage said inlet opening and retain pressurized gas within said passage, an exhaust passage connected to said conduit passage and having a mouth opening into said conduit passage, exhaust valve means operable in said conduit passage and engaging said mouth, means biasing said exhaust valve means into engagement with said mouth, a valve stem connected to said exhaust valve means, a solenoid coil in said housing positioned adjacent to said mouth, an armature operable within said solenoid coil and engageable with said valve stem to operate said exhaust valve means on actuation of said solenoid coil, electrical switch means positioned within said housing and connected to said solenoid coil, and means for translating system pressures within said conduit passage to said electrical switch means to thereby operate said switch means, said conduit means connecting said pump means to said inlet means of said control and exhaust valve means and connecting said outlet means of said control and exhaust valve mechanism to said variable lift means, and signal means connected between said sprung and unsprung masses to measure the distance therebetween, and being connected to said electrical switch means for said exhaust valve means, whereby said exhaust valve means is opened when the distance between said sprung and unsprung masses is greater than a selected amount.

6. In a control and exhaust valve mechanism, a housing, inlet and outlet means in said housing, a passage in said housing extending between said inlet and outlet means, check valve means in said passage adjacent to said inlet means in said housing, said check valve means comprises an elastomeric body having a retainer at one end and a flap seal element at the other end to engage said inlet opening and retain pressurized gas within said conduit passage, exhaust passage means including a mouth opening into said passage between said inlet and outlet means, exhaust valve means operable in said passage between said inlet and outlet means and engageable with said mouth, means biasing said exhaust valve means into engagement with said mouth, a valve stem connected to said exhaust valve means, a solenoid coil positioned in said housing adjacent to said mouth, an armature operable within said solenoid coil and engageable with said valve stem to open said exhaust valve means on actuation of said solenoid coil, electric switch means positioned within said housing and connected to said solenoid coil, and means for translating pressures within said passage between said inlet and outlet means to said electric switch means for actuating said solenoid coil, whereby heat produced by said solenoid coil is effective to melt ice crystals in cold weather formed by freezing of condensate at said mouth.

7. In a control and exhaust valve mechanism, a housing, inlet and outlet means in said housing, a passage in said housing extending between said inlet and outlet means, check valve means in said passage between said inlet and outlet means, and positioned adjacent to said inlet means to retain pressurized gas within said passage, exhaust passage means connected to said passage between said inlet and outlet means and including a mouth opening into said passage, exhaust valve means operable in said passage between said inlet and outlet means and engageable with said mouth, means biasing said exhaust valve means into engagement with said mouth, a valve stem connected to said exhaust valve means, a solenoid coil positioned in said housing adjacent to said mouth and being in surrounding relation to said valve stem, an armature operable within said solenoid coil and engageable with said valve stem to open said exhaust valve means on actuation of said solenoid coil, electric switch means positioned within said body and connected to said solenoid coil, piston means movable in a passage in said body and engageable with said switch means, means biasing said piston means away from said switch means, and elastomeric seal means between said piston means and the interior of said passage between said inlet and outlet means.

References Cited

UNITED STATES PATENTS

| | | | |
|---|---|---|---|
| 3,237,958 | 3/1966 | Saftien | 280—6.1 |
| 3,120,962 | 2/1964 | Long | 280—6 |
| 3,065,976 | 11/1962 | Vogel | 280 |
| 2,965,389 | 12/1960 | Dietrich | 280 |

PHILIP GOODMAN, *Primary Examiner.*